Sept. 10, 1935. T. NACCARATO 2,013,923
BUSHING EXTRACTOR
Filed Feb. 12, 1935 2 Sheets-Sheet 2
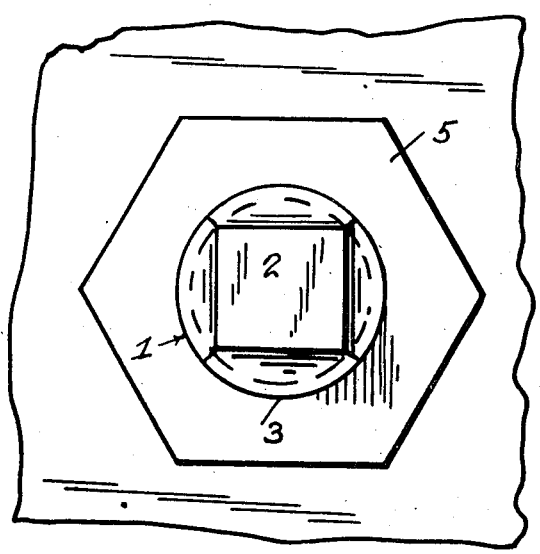
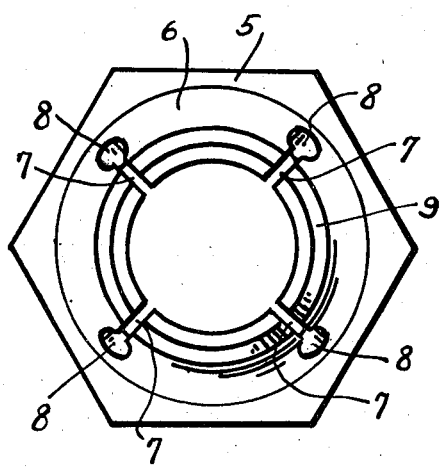
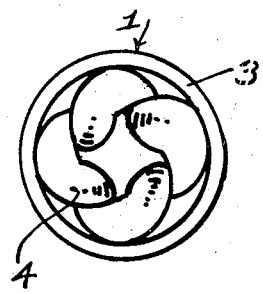
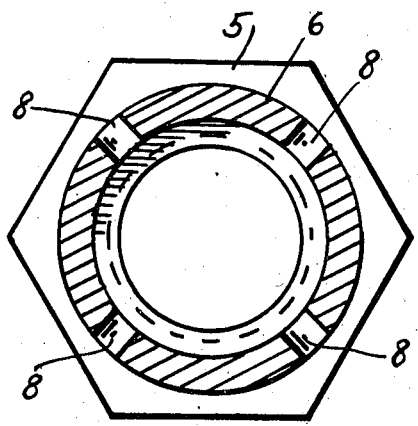
Inventor
T. Naccarato
By *Clarence A. O'Brien*
Attorney Patented Sept. 10, 1935

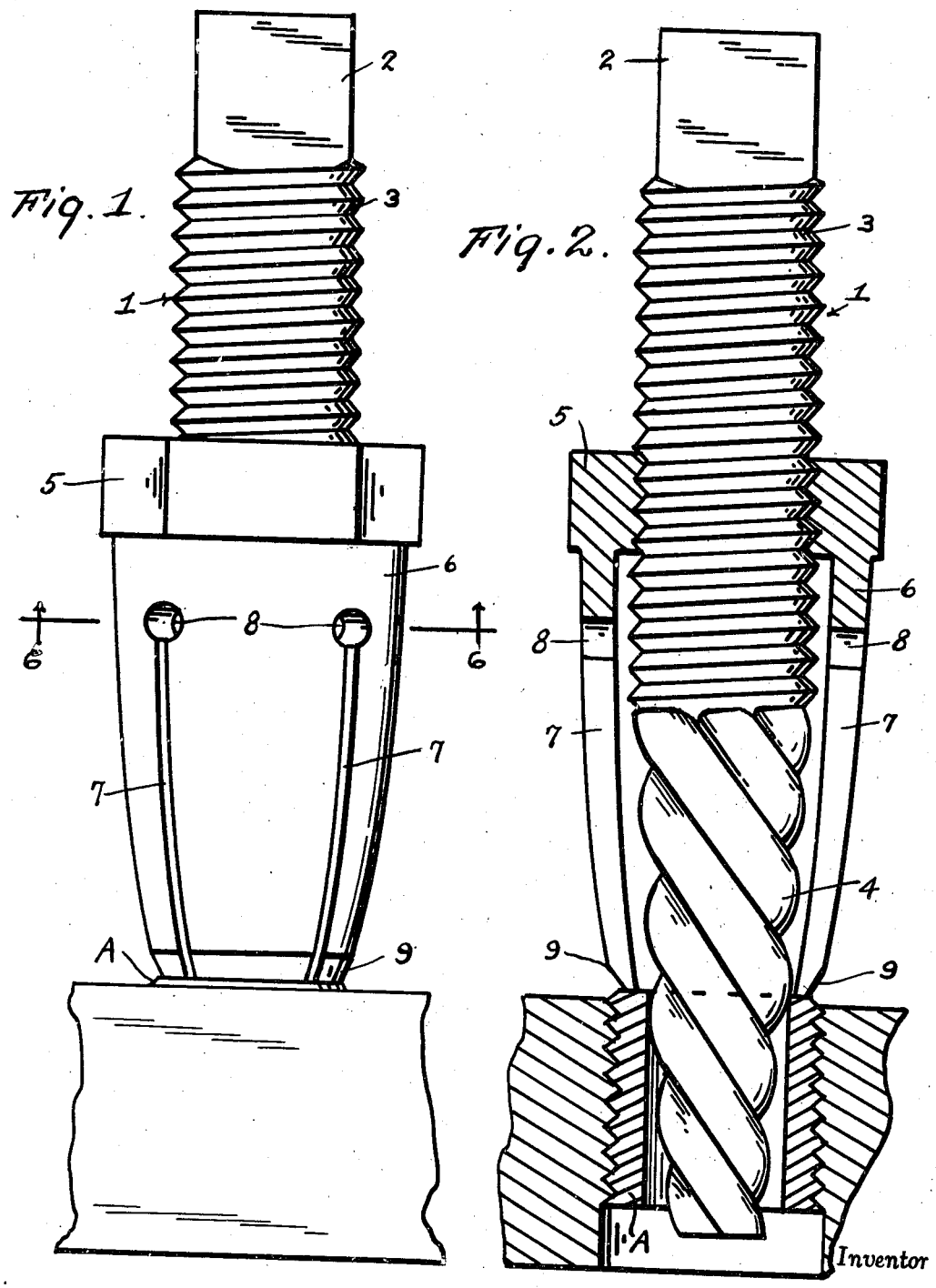

2,013,923

UNITED STATES PATENT OFFICE 2,013,923

BUSHING EXTRACTOR

Tony Naccarato, South Whittier, Calif.

Application February 12, 1935, Serial No. 6,252

1 Claim. (Cl. 29—88.2)

This invention relates to a tool for extracting bushings and the like, the general object of the invention being to provide a shank having a low pitch thread on a cylindrical part thereof and a high pitch multiple thread on a tapered part thereof, the latter part engaging the bushing, with a lock member for locking the tapered portion to the bushing so that said tapered portion cannot expand the bushing.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Fig. 1 is an elevation showing the device in use.

Fig. 2 is a similar view but showing parts in section.

Fig. 3 is a top plan view of Fig. 1.

Fig. 4 is a bottom plan view of the locking member.

Fig. 5 is a bottom plan view of the shank.

Fig. 6 is a section on line 6—6 of Fig. 1.

In these drawings, the numeral 1 indicates the shank which is provided with a non-circular head 2 for receiving a wrench or any other device whereby the shank can be turned, and the shank is also provided with a cylindrical portion having low pitch threads 3 thereon, the rest of the shank being tapered and said tapered part is formed with the high pitch multiple threads 4. A nut 5 is threaded to engage the threads 1 and said nut is formed with a slightly tapered skirt 6 which is provided with the longitudinally extending slots 7 extending from its lower end to a point spaced from its upper end, the upper ends of the slots terminating in the holes 8. The lower end of the skirt is beveled as shown at 9.

In using the device, the nut 5 is turned back to the upper end of the threaded part 1 and then the tapered part 4 of the shank is screwed into the bushing A, until the part 4 has a good hold in the bushing and then the nut 5 is screwed down until the lower end of its skirt engages the bushing, as shown in Figs. 1 and 2. Thus, the nut and skirt prevent any more turning movement of the shank into the bushing and thus prevent the tapered part of the shank from expanding the bushing to make it harder to extract the bushing. Then, the shank is turned in a direction to cause the bushing to screw out of the member in which it has been inserted.

This device can be used for extracting bushings of various kinds and other members that are provided with a bore in which the threaded part of the shank can be placed.

It is thought from the foregoing description that the advantages and novel features of the invention will be readily apparent.

It is to be understood that changes may be made in the construction and in the combination and arrangement of the several parts provided that such changes fall within the scope of the appended claim.

I claim:

An extracting tool of the class described comprising a shank having a cylindrical threaded portion and a tapered portion below the cylindrical portion having high pitch multiple threads thereon, a nut threaded on the cylindrical portion and having a skirt depending therefrom for engaging the member to be extracted, said skirt having slits therein passing through its lower end and making the lower part of the skirt resilient.

TONY NACCARATO.